US011505353B2

(12) United States Patent
Godet et al.

(10) Patent No.: US 11,505,353 B2
(45) Date of Patent: Nov. 22, 2022

(54) METHOD FOR INVERTING THE BASE OF A PLASTIC CONTAINER, DEVICE FOR IMPLEMENTING SAME AND USE OF THE DEVICE

(71) Applicant: SIDEL PARTICIPATIONS, Octeville-sur-Mer (FR)

(72) Inventors: Florian Godet, Octeville-sur-Mer (FR); Jérôme Neveu, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 18 days.

(21) Appl. No.: 16/957,091

(22) PCT Filed: Nov. 28, 2018

(86) PCT No.: PCT/FR2018/053028
§ 371 (c)(1),
(2) Date: Jun. 22, 2020

(87) PCT Pub. No.: WO2019/122563
PCT Pub. Date: Jun. 27, 2019

(65) Prior Publication Data
US 2020/0346809 A1 Nov. 5, 2020

(30) Foreign Application Priority Data
Dec. 21, 2017 (FR) ...................................... 1762739

(51) Int. Cl.
*B65B 61/24* (2006.01)
*B29C 49/12* (2006.01)
(Continued)

(52) U.S. Cl.
CPC .............. *B65B 61/24* (2013.01); *B29C 49/12* (2013.01); *B29C 49/4273* (2013.01); *B29K 2067/003* (2013.01); *B29L 2031/7158* (2013.01)

(58) Field of Classification Search
CPC ..... B65B 61/24; B29C 49/12; B29C 49/4273; B29K 2067/003; B29L 2031/7158; B67C 3/24; B65D 1/02; A61M 5/2053
See application file for complete search history.

(56) References Cited

U.S. PATENT DOCUMENTS 5,341,946 A 8/1994 Vailliencourt et al.
2013/0197475 A1* 8/2013 Dunn .................. A61M 5/2053
604/506

FOREIGN PATENT DOCUMENTS

EP 3081527 A1 10/2016
EP 3109177 * 12/2016 ............... B65D 1/02
(Continued)

OTHER PUBLICATIONS

English translation of CN Office Action dated Jul. 30, 2021.
International search report dated Mar. 14, 2019.

*Primary Examiner* — Jeffrey M Wollschlager
*Assistant Examiner* — Shibin Liang

(57) ABSTRACT

The invention relates to a method for inverting the diaphragm of a filled and capped container. According to the invention, the container is placed on a support ring of an inversion device, a pressing member is applied to the container and a pusher is raised through the support ring to invert the diaphragm and shape the diaphragm into an arch. While the pusher inverts the diaphragm, the seat is moved away from the upper plane of the support ring, so that when the pusher reaches the raised position, a space is opened between the seat and the support ring to enable a longitudinal expansion of the container under the combined effect (Continued)

of the increase in internal pressure caused by the decrease in the volume due to the inversion and the forces generated inside the container by the pusher and the support member.

11 Claims, 4 Drawing Sheets

(51) Int. Cl.
*B29C 49/42* (2006.01)
*B29K 67/00* (2006.01)
*B29L 31/00* (2006.01)

(56) References Cited

FOREIGN PATENT DOCUMENTS

| EP | 3109177 A1 | 12/2016 | |
|---|---|---|---|
| JP | 5205637 * | 3/2013 | ............... B67C 3/24 |
| WO | 0218213 A1 | 3/2002 | |
| WO | 2015039690 A1 | 3/2015 | |

* cited by examiner

METHOD FOR INVERTING THE BASE OF A PLASTIC CONTAINER, DEVICE FOR IMPLEMENTING SAME AND USE OF THE DEVICE

FIELD OF THE INVENTION

The subject matter of the invention is the manufacture of containers, such as bottles, which are obtained by blow-molding or stretch-blow-molding of preforms made of a thermoplastic material (for example PET). The invention applies more particularly although not exclusively to the processing of containers which are hot-filled with contents, notably liquid, and closed, the term "hot" meaning that the temperature of the contents is close to, or higher than, the glass transition temperature of the material of which the container is made. Typically, the hot-filling of PET containers, the glass transition temperature of which is of the order of 80° C., is performed using a liquid the temperature of which is comprised between 85° C. and 100° C.

BACKGROUND OF THE INVENTION

By way of preliminary remark, it is indicated that, in the remainder of the present description and in the claims, for the sake of simplification and unless otherwise indicated, the terms "raised", "lowered", "vertical", "horizontal", "top", "bottom", "upper", "lower" and any comparable terms are to be interpreted when considering the container upright, namely supported on a horizontal plane by its seating surface. The "longitudinal" direction or axis of the container is a vertical direction or axis passing through the centers of the base of the container and of the cap.

It is known practice to produce such a hot-fillable container in a mold heated to a temperature that exceeds that of the contents that will be placed in the container, and to keep the container in the mold after it has been formed by blow-molding or stretch-blow-molding, for a significant length of time (of the order of several tenths of a second) so that contact between the container and the hot mold allows relaxation of the stresses that arise in the material during forming. This manufacture in a hot mold has the effect of preventing the relaxation of the stresses that occurs after molding from occurring during the hot-filling: this is because, were the container to be manufactured in a cold mold, it would soften during the filling and deform in an uncontrolled manner.

However, such a manufacturing approach is not enough to ensure that a container, once completed and filled, will maintain its shape. This is because, after filling and closure (capping), while the contents are still hot, the trapped air contracts during cooling (because it cools) and, to a lesser extent, the liquid contracts, therefore leading to a depression which causes the container to deform by the collapsing of its wall. The container may therefore become ovalized or deform in any other haphazard way, and this may cause problems with handling or with aesthetic appearance.

In order to overcome these disadvantages, containers have therefore been designed in which the lateral wall or walls are provided with compensating panels known as "pressure panels" the purpose of which is to absorb these depressions and prevent haphazard deformation of the containers as they cool, U.S. Pat. No. 5,341,946 describes a container of this type.

However, the presence of the pressure panels limits the possibility, for the container designers, of obtaining shapes that are distinct from one another, and this does not necessarily make marketing any easier. Furthermore, such containers are relatively heavy and are therefore expensive on account of the quantity of raw material they require.

In order to overcome the disadvantages of containers comprising pressure panels, both in terms of marketing and in terms of cost, containers have relatively recently been conceived of in which the base is provided with an invertible central diaphragm surrounded by a region constituting the circular seating surface of the container and the body of which is reinforced with peripheral ribs. The European patent application published under the number EP3109177A1 in the name of the Applicant Company discloses a container of that type, which is lighter in comparison with the earlier containers comprising pressure panels.

According to what is described in that application EP3109177A1, the end of manufacture, the diaphragm is in the form of a dish, the concave face of which faces toward the inside of the container. The diaphragm is contained inside a standing ring that forms a peripheral seating region. The seating region has a height such that it fully contains the diaphragm so that the container can stand upright in this configuration, without the diaphragm being placed on a supporting plane, making it easier to transport and to handle (notably for the purposes of the filling and inversion that will follow). After filling and closure, the diaphragm is pushed up inside using an appropriate device, so as to invert it, so that, at the end of this operation, it takes the form of an arch the convex face of which faces toward the inside of the container.

The device is made up:
  on the one hand, of a lower support plate, also referred to as a support ring, which is annular and fixed with respect to a chassis of the device, which support ring has passing through it a central orifice and comprises a receiving plane surrounding said orifice to receive the seating surface of the container;
  on another hand, of a pusher, which can be actuated by drive means, is arranged beneath the base of the container and able to move, in a vertical direction through the orifice made in the support ring, and has an exterior shape that may correspond more or less to the shape of the diaphragm after inversion;
  and finally of an upper pressing member in the form of a bell which can be positioned over the cap of the container, which member is fixed to the end of an upper connecting block that can be moved vertically with respect to the support ring between a raised position allowing the container to be introduced into the device and a lowered position in which it is held during inversion.

Prior to inversion, the seating surface of the container is placed on the annular plate and the pusher is in a retracted position so that no part of the pusher is above the plane is in contact with the diaphragm. The connecting block is placed in the lowered position, so that the pressing member is positioned above the cap, in fixed contact therewith. When the pusher is actuated, it rises up through the orifice in the plate as far as a final inversion position. With the pressing member holding the container, the diaphragm inverts under the pressure of the pusher and adopts its arched shape.

The inversion, because it takes place after closure, leads to a reduction in the internal volume of the container, causing an immediate overpressure inside the container with the result of a stiffening of the walls. As the liquid cools, the volume of air remaining inside the container contracts and the liquid shrinks, so that the rigidity of the container decreases, but not enough for the user to have the impression that the container has gone "soft" at the time of purchase or until first opening it.

The use of such a container with a diaphragm is not restricted to filling with hot liquids. Specifically, in so far as these containers are lighter than the containers with pressure panels, they are naturally more flexible than the latter. However, because inversion after closure leads to a reduction in the internal volume of the container and to an overpressure inside the container with a stiffening of the walls, it is entirely conceivable to use this type of container with liquids introduced at ambient temperature. At the time of purchase, the user will not be disconcerted upon coming into contact with the container, because the latter will appear rigid to him/her.

However, the device used for inversion and the implementation thereof are not entirely satisfactory.

Specifically, during and right to the end of inversion, the container is subjected, along its vertical axis, to antagonistic forces which arise between the assembly consisting of the support ring and the pusher, on the one hand, and the pressing member on the other hand. However, as soon as the pusher returns to its retracted position, the pressure in the container can sometimes be too high and the diaphragm can collapse, because there is no other portion of the container able to compensate for the overpressure. The inversion is therefore not necessarily irreversible.

Hence, in order to overcome this problem of collapse, there has been envisioned the idea of relieving the stresses exerted on the container by connecting the pressing member to means that are operated in such a way as to move it away from the support ring (such as a mechanism involving a cam and a follower for driving the pressing member when the device is supported by a chassis formed by a rotary carousel) by causing the pressing member to be raised slightly in order to move it away from the top of the container, before the pusher is lowered back down. Such a distancing action allows the internal pressure to tend to lengthen the container: in fact, under the effect of the internal pressure, some of the peripheral ribs of the body of the container deform in the manner of a concertina and the container therefore lengthens, bringing about an increase in its internal volume and a decrease in pressure until such point as the forces due to the internal pressure balance with the resistive forces of the body of the container. In such cases, the diaphragm does not collapse, because its arched shape gives it greater strength than the ribs.

However, a device structured in this way has disadvantages.

Thus, when the pressing member is moved away, the container finds itself simply placed on the support ring and on the pusher for as long as the latter has not begun to redescend toward its retracted position; once the pusher has begun to redescend toward its retracted position it finds itself standing on the support ring alone. The container is therefore no longer held in a stable manner and that means that no other treatment operation can be performed on the container while it is standing on the support ring. Thus, for example, in this configuration, it is impossible to affix a label to the container (which entails applying lateral pressure thereto) or indeed to verify that the inversion has been achieved correctly.

SUMMARY OF THE INVENTION

A first object of the invention is to propose a reliable and simple method that allows irreversible inversion of the diaphragm of a container.

According to the invention, a method for inverting the diaphragm of a filled and capped container comprising a body extended, at the top, by a shoulder surmounted by a neck and comprising, in the continuation of the body toward the bottom, a base comprising the diaphragm contained in a ring ending in a peripheral seating surface forming a standing plane, according to which method the container is placed beforehand on a support ring, a pressing member is applied to the container and a pusher is raised up through the support ring to invert the diaphragm and shape it into an arch, characterized in that, while the pusher is inverting the diaphragm, the seating surface is distanced from the upper plane of the support ring so that, when the pusher reaches its raised position, a space is opened up between the seating surface and the support ring so as to allow longitudinal expansion of the container under the combined effect of the increase in internal pressure brought about by the reduction in volume caused by the inversion and of the forces generated inside the container by the pusher and the pressing member.

According to other features, the inversion method comprises, after having inverted the diaphragm and while the container is positioned with its seating surface on the support ring and while the pressing member is kept pressed against the container, a sequence of checking the inversion of the diaphragm, which sequence comprises the following steps:

moving the pusher from its retracted position toward its final, diaphragm-inversion, position, by applying to it a predetermined driving force lower than a force that would allow a poorly inverted diaphragm to be pushed back up, so that the pusher enters the arch formed by the diaphragm and so that, when the pusher comes into contact with the arch, the container remains pressed against the support ring and the movement of the pusher is stopped as a result of the differential of the forces;

determining the position of the pusher at the moment at which it is stopped and, as a result, determining the amplitude of the movement it has performed;

comparing the amplitude of the movement with a theoretical value which, if achieved, corresponds to a correctly inverted diaphragm and therefore to a correctly formed arch and which, if it is not achieved, corresponds to an arch that is incorrectly formed or even not formed at all.

Another object of the invention is to propose a device for implementing the method.

With the device supported by a chassis, it comprises:
a lower support ring, which is fixed with respect to said chassis, which support ring has passing through it a central orifice and comprises a receiving plane surrounding said orifice to receive the seating surface of a container;
a pusher, that can be moved through the central orifice of the support ring in a vertical direction by drive means secured to the chassis, the pusher being able to be moved from a retracted position to a final inversion position in which it is located above the plane of the support ring;
an upper pressing member, intended to press against the capped container when the latter is in place and to counter the force of the pusher when the latter is moved toward the inversion position, which member is fixed to one end, situated facing the support ring and the pusher of a connecting block connected to the chassis by a translational connection that allows the block to be moved vertically with respect to the support ring between a raised position, that allows the container to be introduced into the device, and a lowered position, in which the block is held during inversion;

and it is characterized in that the pressing member is fixed to said end of the block by elastic-compression connecting means which are arranged in such a way that said member is itself able to move in translation with respect to the block in a direction perpendicular to the plane of the support ring and so that, in the absence of a container between the support ring and the pressing member, the latter is in a first extreme position, lowered relative to the block, and so that, when a pressure higher than the minimum return force of the elastic-compression connecting means is exerted upward against this member, it rises toward a second, raised, extreme position, away from the support ring, in that the distance between the pressing member and the support ring is such that, when a container of which the diaphragm is to be inverted is in place on the support ring and the block reaches the lowered position, the pressing member comes into contact with the container, A device according to the invention allows the inversion of a diaphragm to be carried out without the diaphragm trying to return toward its initial position when the pusher is returned toward its retracted position, and holds the container after inversion and return of the pusher to its retracted position, thereby allowing other treatments, such as labeling. Specifically, the elongation of the container during inversion allows an increase in volume that goes some way toward compensating for the volume lost by the inversion of the diaphragm and therefore an appreciable reduction in the internal pressure.

According to other features considered alone or in combination:

the drive force with which the pusher is driven can be selected between a predetermined value, higher than the maximum return force of the elastic-compression connecting means and a value lower than the minimum return force of said means;

the pressing member is designed to come to press against the capping means of the container;

the pressing member is in the form of a bell the dimensions of which are such that it is able to contain the capping means of the container and the peripheral edge of which is designed to come to press against an upper region of the container, such as the shoulder thereof;

the elastic-compression connecting means by means of which the pressing member is fixed to said end of the block comprise a spring in compression; the spring is made of metal, the spring is made of elastomer;

the pressing member has a travel, relative to the end of the block to which it is fixed, between its raised and lowered positions, less than or equal to 10 mm; preferably the travel is less than 5 mm;

the pusher has an exterior shape substantially corresponding to the shape of the diaphragm after inversion.

The invention also relates to a use of the device for inverting a diaphragm, characterized in that it comprises, in succession, the following steps:

positioning the container with its seating surface on the support ring while the pusher is in the retracted position and the block is in the raised position;

bringing the block into its lowered position so that the pressing member comes to bear on the container;

moving the pusher from its retracted position toward its final, diaphragm-inversion, position by applying to it a predetermined drive force higher than the maximum return force of the elastic-compression connecting means, so that, as the pusher moves, the force applied under the container causes;

it to rise, so that the seating surface moves away from the support ring, and the accompanying compression of the elastic means so that the pressing member is moved toward its raised position under the effect of the push applied by the raising of the container, the diaphragm to be driven toward its inverted position, causing a reduction in the internal volume of the container and an increase in its internal pressure, the result of which is a longitudinal expansion of the container under the effect of the internal pressure and an accompanying closing of the distance between the seating surface and the support ring.

According to another feature, the pusher is returned toward its retracted position and, as a result, the lowering of the container back down onto the support ring with the pressing force on the container being maintained under the action of the elastic-compression connecting means.

Thus, when the seating surface moves away from the support ring, stresses in the walls of the container are relieved, thereby allowing the seating surface to drop down slightly toward the support ring through the elongation/deformation of the container under the effect of the internal pressures while the pusher continues to move toward the inversion position.

By comparison with the methods of the prior art, the residual internal pressure after inversion is lower, thereby avoiding the tendency of the diaphragm to collapse as the pusher returns toward its retracted position. Furthermore, because the compression means remain active, the container is held in place and it is possible to perform other treatment operations (notably labeling).

According to other features, the minimum return force of the compression means is of the order of 250 N; the force applied to the pusher by its drive means during inversion is comprised between 400 N and 1000 N; the force applied to the pusher for the check is of the order of 150 N.

BRIEF DESCRIPTION OF THE FIGURES

Further features and advantages of the invention will become apparent from reading the following description given in connection with the attached drawings, in which:

in FIG. 7 it is partial, and in FIG. 8, which illustrates an extreme case, it has not taken place).

DETAILED DESCRIPTION

Figure 1:
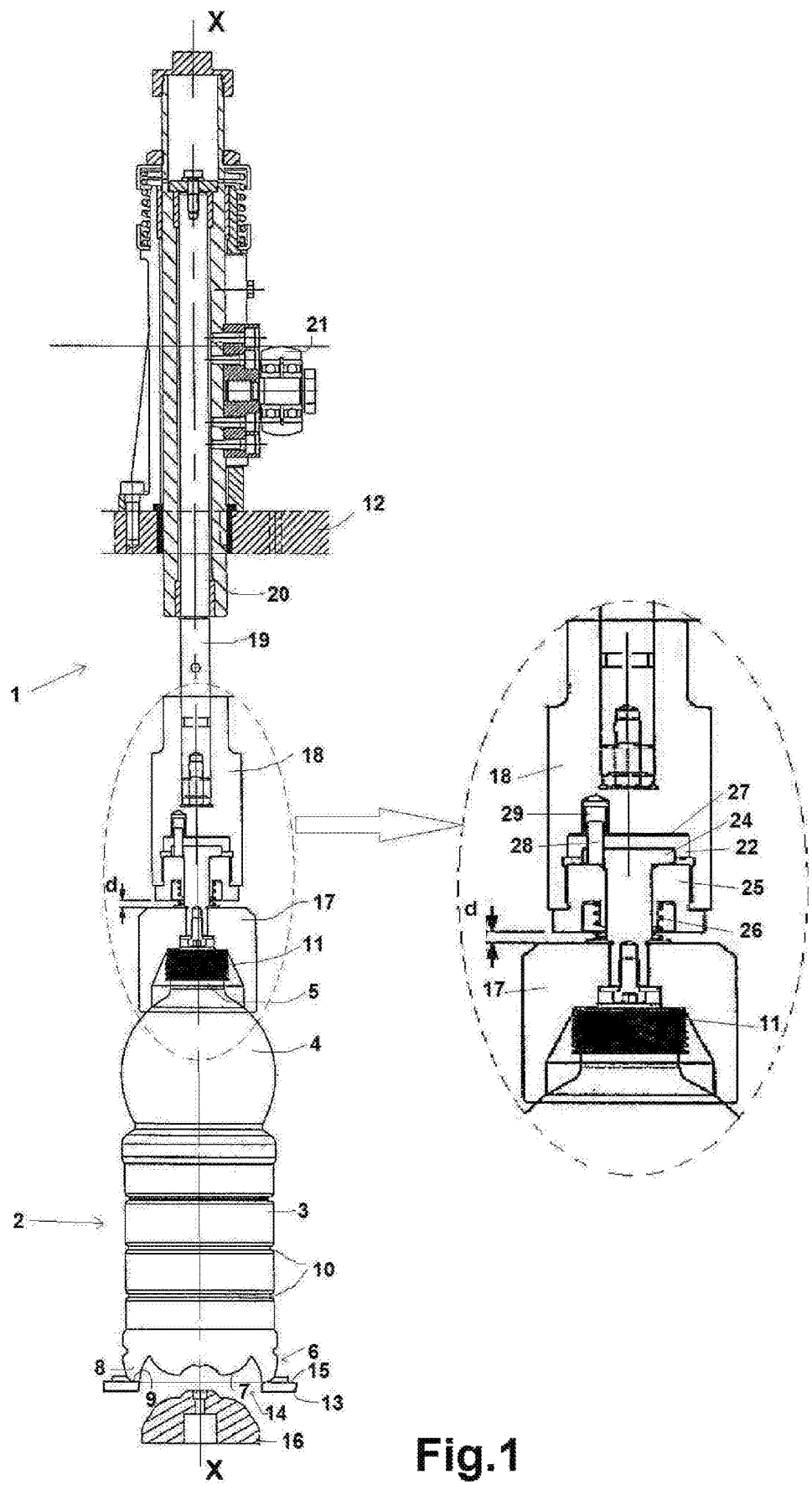
FIG. 1 is a schematic view illustrating the device and its various components with a container positioned on the support ring, prior to the start of the inversion step. This view comprises an inset with an enlarged detail of the pressing member.

FIGS. 1 to 7 show a device for inverting diaphragms of containers 2 such as bottles.

Such containers 2, like the one illustrated, comprise a body 3, in this instance cylindrical, extended, at the top, by a shoulder 4 itself surmounted by a neck 5. In the continuation of the body 3 toward the bottom, the container 2 is provided with a base 6 comprising a diaphragm 7, in this instance of circular cross section, but which may have other shapes allowing it to be turned in, contained within a ring 8 ending in a peripheral seating surface 9 forming a standing plane.

In FIG. 1, the container 2 is in its configuration after manufacture by blow-molding or stretch-blow-molding and the diaphragm 7 is in the general form of a disk the concave face of which faces toward the inside of the container 2.

In the example, the container 2 is a cylinder of revolution and its body 3 is reinforced by horizontal ribs 10. Rather than being cylindrical, it could have a shape such as a shape that can be inscribed more or less inside a square (a container or bottle in the shape known as a "squircle") or any other cross section. However, in order to allow its inversion, the diaphragm would maintain a somewhat circular cross section. The exterior contour of the ring 8 would be designed to extend the shape of the body and fade into the seating surface 9.

The shoulder 4 of the container, is itself bullet-shaped. It too could adopt any known shape (frustoconical, flute shaped, etc.).

The device 1 is designed to invert diaphragms 7 of filled and capped containers. So, the container 2 is offered up with capping means 11, such as a cap screwed onto the neck 5.

As illustrated in the figures, the device 1 is supported by a chassis 12 (depicted in part) and comprises a lower support ring 13 which is fixed with respect to said chassis 12 (the connection between the support ring 13 and the chassis 12 is not depicted but is within the competence of those skilled in the art), which support ring 13 has passing through it a central orifice 14 and delimits an upper, receiving plane 15, surrounding said orifice 14, to receive the seating surface 9 of a container.

A pusher 16 is provided and can be moved through the central orifice 14 of the support ring 13 in a vertical direction by drive means (not depicted) secured to the chassis 12 and to the pusher 16 but comprising for example an electric drive motor. The drive means allow the pusher 16 to be moved from a retracted position (that of FIG. 1) in which it lies for example fully below the upper plane 15 of the support ring 13, into a final inversion position (that of FIG. 4) in which it is above the upper plane 15 of the support ring 12.

The pusher 16 has an exterior shape preferably corresponding to the shape of the diaphragm 7 after inversion. However, the pusher 16 could have a less elaborate shape, such as, for example, that of a suitable rod.

The device 1 further comprises an upper pressing member 17. As will be explained in greater detail later, this pressing means 17 is intended to press on the capped container 2 when the latter is in place on the support ring 13 and thus counter the force of the pusher 16 when the latter is moved toward the inversion position.

In the example, the pressing member 17 consists of a bell-shaped component which fits over the capping means 11 (and therefore the neck 5 of the container) and comes to bear against a shoulder region 4 slightly below the neck 5. Rather than consisting of a bell pressing against the shoulder, the pressing member 17 could consist of a component simply pressing down on the capping means 11. However, the bell shape is more advantageously in so far as it generates less stress on the container 2. Specifically, pressing on the capping means 11 generates pressure at the junction between the neck 5 and the shoulder 4, which is a region with a small cross section which has not been stretched at all and is therefore fragile, whereas the bell shape presses over a larger cross section, which means that the bearing pressure is lower (for an equivalent applied force).

The pressing member 17 preferably presses over the entire circumference of the shoulder. However, it should be noted that it could comprise a portion of the frustoconical wall thereof, so as to allow for clearance of the bottle during the phases of loading it onto/unloading it from the support ring 13 and thus to limit the travel of the block 18 when the device 1 is carried on a carousel or is able to move with respect to a zone for the loading and/or a zone for the unloading of the containers 2.

The pressing member 17 is fixed to one end, situated facing the support ring 13 and the pusher 16, of a connecting block 18 connected to the chassis 12 by translational connection that allows the block to be moved vertically with respect to the support ring between a raised position that allows the container to be introduced into the device and a lowered position in which the block 18 is kept during inversion.

As visible in the figures, notably in FIG. 1, the block 18 is fixed to the end of a shaft 19 mounted with the ability to slide in the vertical direction in a sleeve 20 borne by the chassis 12. Thus, the block 18 can be brought closer to or distanced from the support ring 13.

The shaft 19 and therefore the block 18 are connected to a mechanism which allows a movement of raising and lowering of the shaft 19 and of the block 18 and firm retention of the shaft 19 and of the block 18 in the lowered position during inversion and checking. The various figures illustrate the block 18 in the lowered position in which it is firmly held during inversion.

The mechanism that allows said raising and lowering movement of the equipment consisting of the shaft 19 and of the block 18 is, for example, a cam and follower mechanism. Only a follower 21 is depicted in the figures. The mechanism may comprise, above the follower 21, a first cam, referred to as the top cam and, underneath, a second cam (also referred to as bottom cam or countercam). The two cams serve to guide the follower 21 to raise or lower the equipment consisting of the shaft 19 and the block 18, the top cam pressing on the follower and preventing the equipment consisting of the shaft 19 and of the block 18 from rising when pressure is exerted upward under the pressing member 17. It would also be conceivable to have a mechanism comprising just a top cam, a follower and a raising spring applying a force that opposes that of the top cam. It would be further conceivable to have a motorized mechanism for raising or lowering the equipment consisting of the shaft 19 and the block 18, which would make it easier to customize the device to take account of the variations in height of containers from one production phase to another.

According to the invention, the pressing member 17 is fixed to the block 18 by means of elastic-compression connecting means. These are designed so that said member is itself able to move translationally with respect to the block 18 in a direction perpendicular to the plane of the support ring and so that, in the absence of a container between the support ring 13 and the pressing member 17, the latter is in a first extreme position, lowered relative to the block 18 and so that, when pressure higher than the minimum return force of the elastic-compression connecting means is exerted upward against this member 17, the latter rises toward a raised second extreme position, moving away from the support ring 13.

To that end, the elastic-compression connecting means visible in the inset of FIG. 1 are arranged as described hereinafter.

The block 18 is hollowed out, at its opposite end to the shaft 19, with a housing 22 oriented along the axis X-X of the installation 1, namely an axis which passes through the center of the central orifice 14 of the support ring 13 and which coincides with that of the shaft 19, of the pusher 16, of the pressing member 17 and of the block 18 itself. The housing therefore opens toward the pressing member 17. The pressing member 17 is fixed, at its top part, for example by screwing, to a rod 23 which terminates, at its opposite end to the pressing member 17, in an annular flange 24 forming a flat head surrounding this end.

The part of the rod 23 that is situated between the flange 24 and the pressing member 17 is positioned in a sleeve 25 in which it can slide freely. The length of this part of the rod 23 is therefore greater than the length of the sleeve 25 leaving space for the fitting of a spring 26 that works in compression around the rod 23 between the pressing member and the sleeve 25. Considering the orientation of the figures, in which the pressing member 17 is positioned below the sleeve 25, the spring is therefore positioned on top of the pressing member 17 and under the sleeve 25. Thus, in the absence of upward pressure (considering the orientation of FIG. 1) against the pressing member 17, as visible in the inset, the spring 26 tends to keep the pressing member 17 in the position in which it is distanced from the sleeve 25 (by pushing it downwards, still considering the orientation of the figure) and the flange 24 is therefore in abutment on top of the sleeve 25. It is important to note that the dimensions of the rod 23, of the sleeve 25 and of the spring 26 are such that they allow an upward movement of the pressing member 17 when pressure is exerted on the underside thereof.

The sleeve 25 is pushed into the housing 22 in such a way that the flange 24 and therefore the upper end of the rod 23 are placed inside the housing 22. Further, the sleeve 25 and the housing 22 are arranged in such a way that, when the sleeve 25 is in place, there is still some separation between the upper end of the rod 23 and the upper wall 27 of the housing 22, so as to allow the rod 23 to slide freely in the sleeve 25 when the pressing member 17 is urged upward.

The dimensions of the rod 23, of the sleeve 25 and of the spring 26 are such that, in the absence of upward pressure against the pressing member 17, the separation between the top of the pressing member 17 and the bottom of the sleeve 25 allows the pressing member 17 an upward movement over a predetermined maximum distance d when pressure is exerted upward against the pressing member 17.

Thus, in the absence of upward pressure against the pressing member 17, the latter is in a first extreme position, lowered relative to the block 18. When urged upward, the raising movement stops when the pressing member 17 comes into contact with the sleeve 25, that is to say, in other words, when the pressing member 17 has covered the maximum distance d.

In that case, the separation between the upper end of the rod 23 and the upper wall 27 of the housing 22 is such that it is at least equal to the maximum distance d so as to allow the pressing member 17 to move relative to the block 18.

In an alternative, it is the separation between the upper end of the rod 23 and the upper wall 27 of the housing 22 that determines the maximum distance d of the rod 23, the upper wall 27 then constituting an end stop to halt the rod. In that case, the magnitude of the separation corresponds to the distance d.

Preferably, as illustrated in the figures and more particularly visible in the inset of FIG. 1, means, such as a finger 28, are provided to prevent any rotation in the block 18 of the assembly consisting of the pressing member 17 and of the rod 23. For that purpose, the finger 28 is fixed for example by screwing into a screw thread 29 formed in the upper wall 27 of the housing 22 and the finger 28 passes through a hole formed in the flange 24, preventing any rotation, but not preventing a vertical movement of the assembly in question.

As an example of an order of magnitude, the magnitude of the separation between the top of the pressing member 17 and the bottom of the sleeve 25 or, alternatively, the magnitude of the separation between the upper end of the rod 23 and the upper wall 27 of the housing 22 is such that the maximum distance d that the pressing member 17 can cover is less than 10 mm, for example comprised between 3 mm and 8 mm. In one embodiment, for containers 2 consisting of 1 l bottles, a travel over a distance d of 4 mm suffices.

Adjusting means, not illustrated, are provided in the device so that, when a container 2 of which the diaphragm 7 is to be inverted is in place on the support ring and the block 18 reaches the lowered position, the pressing member 17 itself comes into contact with the container 2, without pressing on it, or is even slightly distanced therefrom. This is because it is necessary to adapt the device 1 to take account of the dimensions of the container 2 that is to be processed, notably the height thereof. The adjustment may be made for example by altering the position of the follower 21 on the shaft 19 and/or by altering the position of the cam (not illustrated) which collaborates with the follower 21.

In the embodiment illustrated in FIG. 1, in which the pressing member 17 is in the shape of a bell, once the block 18 has been adjusted and lowered into the lowered position, the pressing member 17 comes into contact with the shoulder 4 of the container 2, or is slightly distanced therefrom. However, as mentioned beforehand, there could be an arrangement that pressed on the container capping means.

Again as an example of an order of magnitude, the minimum return force of the compression means consisting of the spring 26 is comprised between 100 and 300 N; in one embodiment, for a 1 l bottle, it is 250 N. This minimum force is the force when the spring is relaxed, namely when the spring is in the position of FIG. 1. However, given the smallness of the distance d, it will be considered hereinafter that the return force does not increase significantly when the spring is compressed to the maximum, which means that the term "return force" will be used regardless of the position of the pressing member 17 relative to the block 18.

The means for driving the pusher 16 are designed so that the force applied to the pusher can vary between inversion and checking. Thus, during inversion, the force (referred to as the "inversion force") applied to the pusher 16 may be comprised between 400 N and 1000 N. During checking, the force applied to the pusher 16 is lower than the return force of the spring 26 and than the force necessary to move the diaphragm; in one embodiment, the force applied to the pusher 16 during checking (referred to as "checking force") is comprised between 100 and 200 N; in one embodiment it is of the order of 150 N.

It will be understood later on why the force applied to the pusher 16 during checking needs to be lower than the return force of the spring 26. Thus, if the return force of the spring is 200 N, then the force applied to the pusher 26 during checking needs to be strictly lower than 200 N.

The way in which the device works will now be explained in detail.

Before inversion, a previously filled and capped container 2 is placed on the support ring 13 while the pressing member 17 is raised up high enough not to interfere with the cap 11. The raising of the pressing member 17 is performed by raising the equipment consisting of the shaft 19 and the block 18 to which it is mechanically connected by the rod 23 and the sleeve 25. The pressing member 17 is lowered back down to come into contact with the container 2, in this instance into contact with the shoulder 4, without pressing down on it at this stage. If the pressing member 17 is a bell with a wall portion truncated to allow the passage of the capping means 11 during introduction of the container 2 to the support ring 3, the raising is to a lesser extent.

Figure 2:
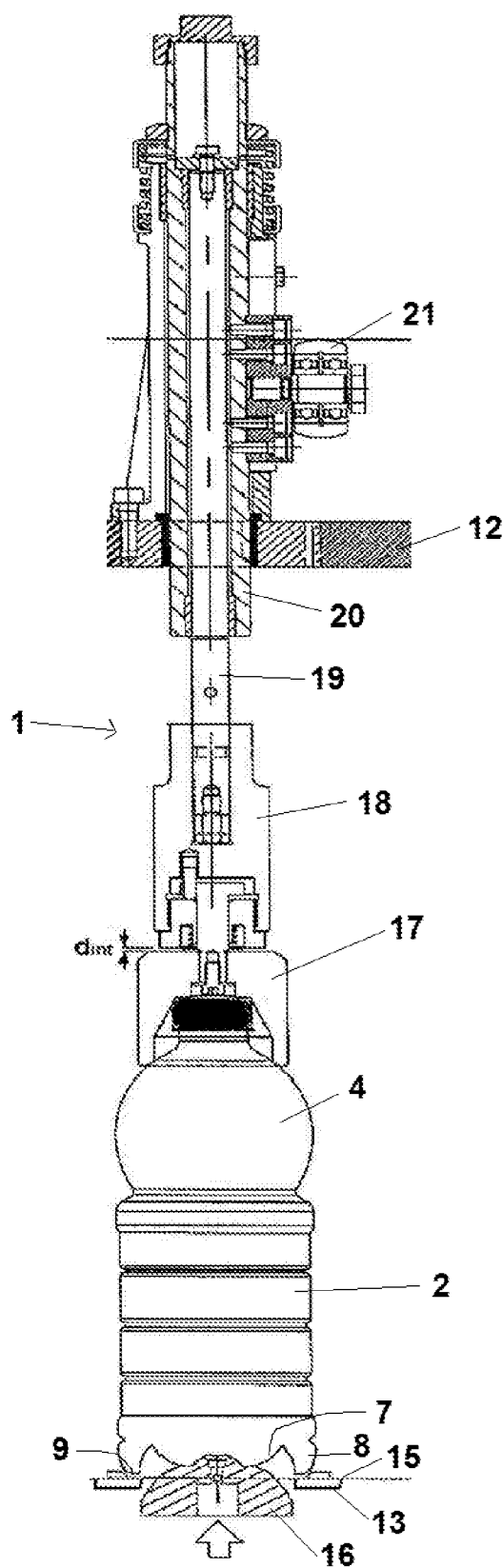
FIG. 2 is a schematic view illustrating the device with the pusher beginning to rise, at the start of the inversion sequence, before the diaphragm is pushed up.

Then, as illustrated in FIG. 2, the raising of the pusher 16 is begun, by applying the inversion force to it. Because the container 2 is filled and closed, it has a certain mechanical rigidity. This, combined with the fact that the structure of the installation is such that the inversion force is greater than that exerted by the spring 26 on the pressing member 17 means that the raising of the pusher 16 causes a raising of the container 2, the seating surface 9 of which moves away from the support ring 13, rising above the upper plane 15 thereof, and the container 2 itself pushes the pressing member 17 upward until the maximum distance d has been covered. The result of this is that the seating surface 9 moves away from the upper plane 15. As will be seen later, during this raising of the pressing member 17, the inversion of the diaphragm 7 can begin, as too may the lengthening of the container 2, so that, when the pressing member 17 reaches its raised position, the seating surface 9 can be distanced from the upper plane 15 of the support ring by a distance smaller than the distance d.

FIG. 2 shows the device 1 while the pressing member 17 is in an intermediate position between its lowered position and its position in which the maximum distance d has been covered. There is therefore still a portion $d_{int}$ of the distance d to be covered. It will be noted from this FIG. 2 that the seating surface 9 has lifted slightly from the upper plane 15 of the support ring.

Figure 3:
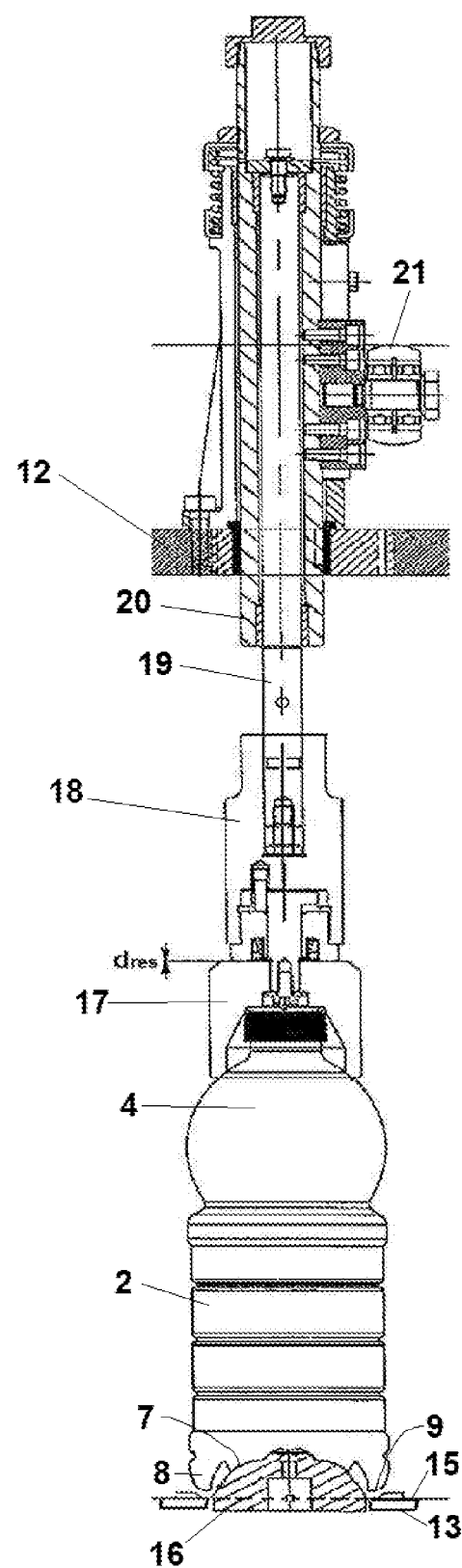
FIG. 3 is a schematic view illustrating the device with the pusher in an intermediate position and the inversion of the diaphragm in progress.

Next, FIG. 3, when the pressing member 17 has covered the maximum distance d, the seating surface 9 is distanced from the upper plane 15 of the support ring 13 and lies a distance from this plane. The magnitude of this distance may correspond to that of the maximum distance d or may be less if, during the initial rise, the inversion, mentioned hereinafter, and likewise the elongation of the container 2, have been able to begin such that, when the pressing member 17 reaches its raised position, the seating surface 9 can be distanced from the upper plane 15 of the support ring by a distance less than the distance d. In that way, the pressing member 17 is in contact with the block 18 and the residual value $d_{res}$ of the distance is zero. Next, the pusher 16 continues to rise to invert the diaphragm 7 (or complete the inversion if it had begun earlier during the rising of the pusher 16). The following phenomenon then occurs, which is the result of the invention. The deformation of the diaphragm 7 toward the inside of the container 2 brings about an increase in its internal pressure which is first of all compensated for by a compression and therefore a reduction in the volume of air remaining in the neck (the head space) of the container, the liquid contained in the container 2 maintaining its volume, because of its incompressibility. When the air is fully compressed, the forces generated by the pusher 16 and the pressing member 17 inside the container 2 become such that the container 2 experiences internal stresses which have a tendency to push back on its walls. Now, the distancing brought about during the raising of the pusher 16 between the seating surface 9 and the upper plane 15 of the support ring 13 allows a stress space to be opened up, and the generated forces which tend to push back on the walls cause a longitudinal expansion of the container 2 so that, at the end of inversion, the seating surface 9 has moved closer to the upper plane 15 of the support ring 13 while the pressing member 17 is still in the raised position, as visible in FIG. 4.

Tests carried out on 1 l containers have demonstrated that a movement over a distance d of 4 mm makes it possible for the seating surface 9, at the end of inversion, to have come back down to a maximum distance from the upper plane 15 of the support ring 13 of the order of 2 mm, without however coming back into contact with this plane. This means that it is possible to be near-certain that the residual internal pressure after inversion is lower, compared with the earlier methods, and to avoid the tendency of the diaphragm 7 to collapse, during the return of the pusher 16 toward its retracted position, as it sometimes did in the prior art.

Figures 4, 5:
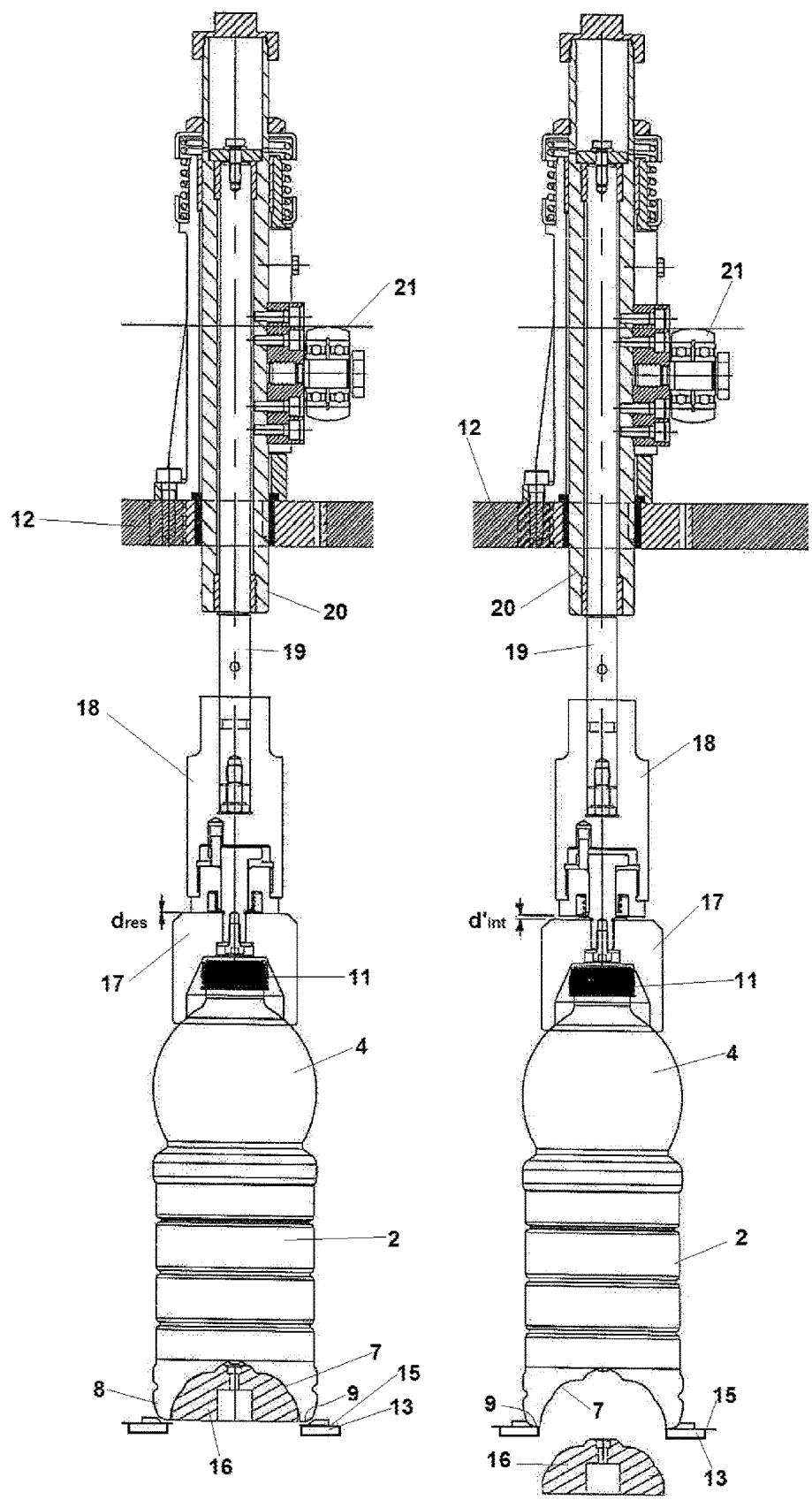
FIG. 4 is a schematic view illustrating the device at the end of the inversion of the diaphragm.
FIG. 5 is a schematic view illustrating the device after inversion, and after the pusher has returned to the lowered position.

After inversion, as visible in FIG. 5, the pusher 16 is returned to its original position (the position it occupied before inversion) and the seating surface 9 of the container 2 with its inverted membrane has lowered back onto the upper plane 15 of the support ring 13. It should be noted that, as the pusher 16 comes back down, the pressing member 17 accompanies the movement so that the container 2 is sandwiched between the pusher 16 and the pressing member 17 until the seating surface 9 returns to the upper plane 15 of the support ring 13. In other words, the container is guided throughout the re-lowering phase. Furthermore, because the container 2 has experienced a longitudinal expansion during the inversion, when the seating surface 9 reaches the support ring 13, the pressing member 17 is still applying a certain pressure to the container 2 (more specifically to the shoulder 4 thereof), because the spring 26 is still more or less compressed. In fact, the pressing member 17 is not in its initial position at this stage but is in an intermediate position, at a distance $d'_{int}$ comprised between the distances d and $d_{res}$, namely the distances before and after inversion. By way of example, in the case of a maximum distance d of 4 mm, if the container has lengthened by 2 mm, the pressing member 17 is 2 mm higher than in its original position (that of FIG. 1).

Figure 6:
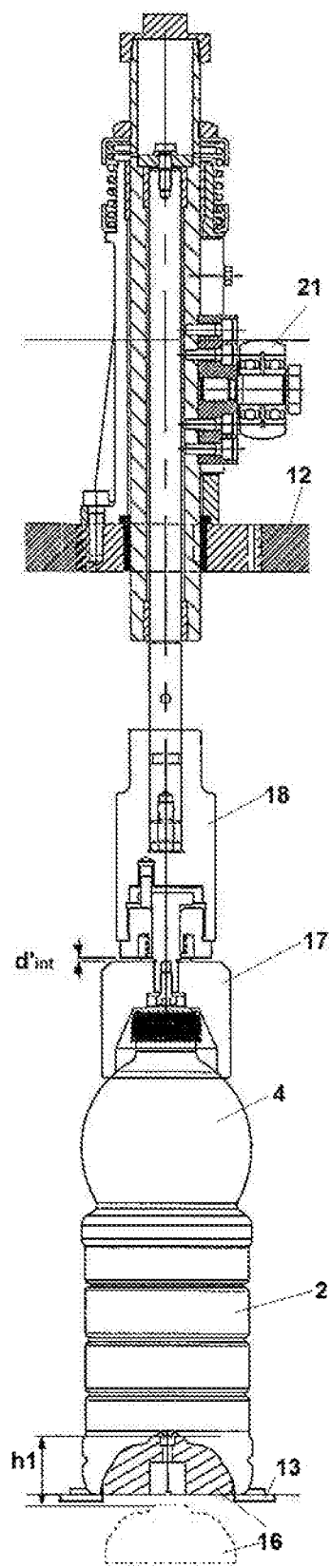
FIGS. 6 to 8 illustrate how the device is used to check the quality of the inversion (in FIG. 6 the inversion is correct.
Figure 7:
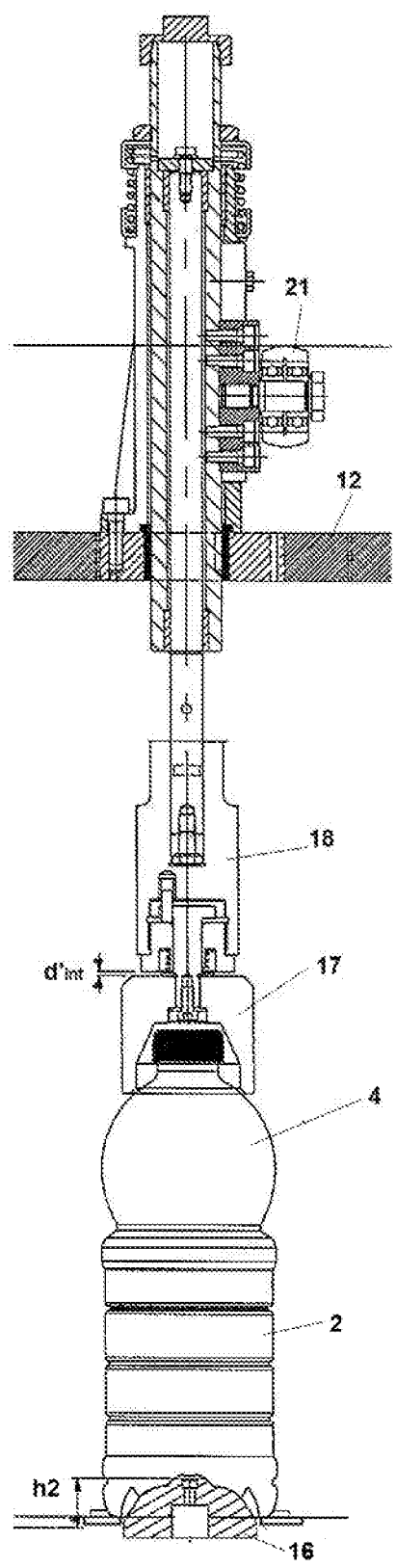
Figure 8:
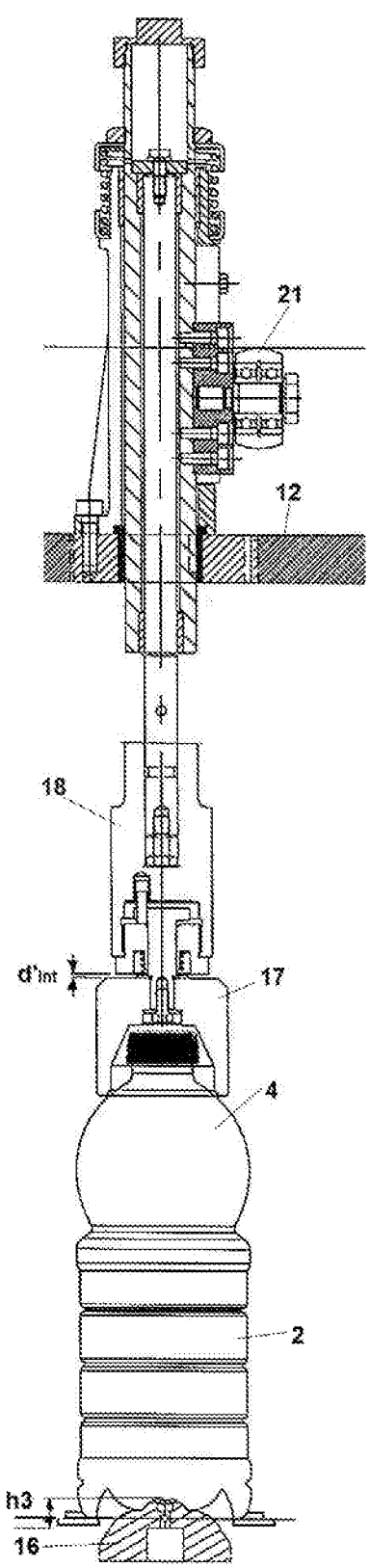

The device 1, as designed, also makes it possible to check that, at the end of inversion, the diaphragm 7 has remained in its inverted position (that of FIG. 5) and has not partially or completely returned to its original position. The check is illustrated by FIGS. 6 to 8.

At the end of inversion, as described above, the pusher 16 is lowered back down to its initial position and the pressing member 17 is partially lowered back down, to a distance $d_{int}$ from the block 18, so that it is not in abutment upward against the latter. The check is then performed by causing the pusher 16 to rise, while applying to it the checking force mentioned hereinabove, which is less than the return force of the spring 26 and which is such that it would not be able to overcome the rigidity of the container and push back up a diaphragm that had been poorly inverted; preferably, the checking force applied to the pusher 16 is comprised between 100 and 200 N; in one embodiment it is of the order of 150 N.

When the pusher 16 comes into abutment upward against the diaphragm 7, it stops automatically because the stresses it then experiences (the return force of the spring and the rigidity of the container) are higher; the magnitude of the travel of the pusher 16 before it stops is then determined.

The diaphragm is considered to be correctly or incorrectly inverted according to whether or not the magnitude is acceptable.

By way of example, if during the phases illustrated by FIGS. 1 to 4 the inverting of a diaphragm requires a nominal vertical travel of the pusher 16 of 35 mm with respect to its original position, the diaphragm may be deemed to have been inverted correctly if the stopping of the pusher 16 during the checking phase occurs at 35 mm, namely if no dropping down of the diaphragm, however minimal, has occurred. In such a case, it may be deemed that the diaphragm 7 has been incorrectly inverted if the stoppage during the checking phase occurs strictly before the nominal travel has been reached.

As an alternative, the diaphragm may be deemed to have been formed correctly when a variation of a few percent with respect to the nominal travel has occurred (for example the diaphragm has dropped back down by 2 mm, which corresponds to a stoppage at 33 mm during the check in the example considered). In such a case, the diaphragm 7 may be deemed to have been incorrectly inverted if the variation exceeds the permissible percentage (stoppage before the pusher 16 has covered the 33 mm in this example).

FIG. 6 illustrates the case of a correctly inverted diaphragm 7, the pusher 16 having risen by the full amount with respect to its original position, illustrated in broken line in this figure, by a height h1.

FIG. 7 illustrates the case of an incorrectly inverted diaphragm 7, the pusher 16 having risen with respect to its original position only by a height h2 that is very much smaller than h1 (h2<h1).

Finally, FIG. 8 illustrates the case of a diaphragm 7 that has absolutely not been inverted, the pusher 16 having risen by just a few mm, the magnitude h3 of the height risen being even smaller still, because it is the height needed, starting from FIG. 1, to reach the diaphragm before beginning to push the container upward and then perform the inversion,

The invention claimed is:

1. A device (1), borne by a chassis (12), comprising:
   a lower support ring (13), which is fixed with respect to said chassis (12), which support ring has passing through it a central orifice (14) and comprises a receiving plane (15) surrounding said orifice (14) to receive the seating surface (9) of a container;
   a pusher (16), that can be moved through the central orifice (14) of the support ring (16) in a vertical direction by drive means secured to the chassis, the pusher (16) being able to be moved from a retracted position to a final inversion position in which it is located above the plane of the support ring;
   an upper pressing member (17), intended to press against the container (2) when the latter is in place and to counter the force of the pusher (16) when the latter is moved toward the inversion position, which member (17) is fixed to one end, situated facing the support ring (13) and the pusher (16), of a connecting block (18) connected to the chassis (12) by a translational connection that allows the block (18) to be moved vertically with respect to the support ring between a raised position, that allows the container to be introduced into the device, and a lowered position, in which the block (18) is held during inversion;
   and wherein the pressing member (17) is fixed to said end of the block (18) by an elastic-compression connecting device (24, 25, 26) arranged and connected to allow said member (17) to move in translation with respect to the block (18) in a direction perpendicular to the plane (15) of the support ring (13) and so that, in the absence of the container (2) between the support ring (13) and the pressing member (17), the latter is in a first extreme position, lowered relative to the block (18) and so that, when a pressure higher than a minimum return force of the elastic-compression connecting device (24, 25, 26) is exerted upward against this member, it rises toward a second, raised, extreme position, away from the support ring (13).

2. The device (1) as claimed in claim 1, wherein a distance between the pressing member (17) and the support ring is such that, when the container of which the diaphragm (7) is to be inverted is in place on the support ring (13) and the block reaches the lowered position, the pressing member (17) comes into contact with the container.

3. The device (1) as claimed in claim 1, wherein a drive force with which the pusher (16) is driven can be selected between a predetermined value, higher than a maximum return force of the elastic-compression connecting device (24, 25, 26) and a value lower than the minimum return force of said means.

4. The device (1) as claimed in claim 1, wherein the pressing member (17) is designed to come to press against the cap (11) of the container (2).

5. The device (1) as claimed in claim 1, wherein the pressing member (17) is in the form of a bell the dimensions of which are such that it is able to contain a cap (11) of the container and the peripheral edge of which is designed to come to press against an upper region of the container (1), such as the shoulder (4) thereof.

6. The device (1) as claimed in claim 1, wherein the elastic-compression connecting device by means of which the pressing member is fixed to said end of the block comprise a spring in compression.

7. The device (1) as claimed in claim 6, wherein the spring is made of metal.

8. The device (1) as claimed in claim 6, wherein the spring is made of elastomer.

9. The device (1) as claimed in claim 1, wherein the pressing member (17) has a travel, between its raised and lowered positions, less than or equal to 10 mm.

10. The device (1) as claimed in claim 9, wherein the travel is less than 5 mm.

11. The device (1) as claimed in claim 1, wherein the pusher (16) has an exterior shape substantially corresponding to the diaphragm (7) after inversion.

* * * * *